June 8, 1926.
N. HARMAN
EAR LOOP ATTACHMENT FOR DEAF PHONES
Filed June 2, 1925
1,587,643
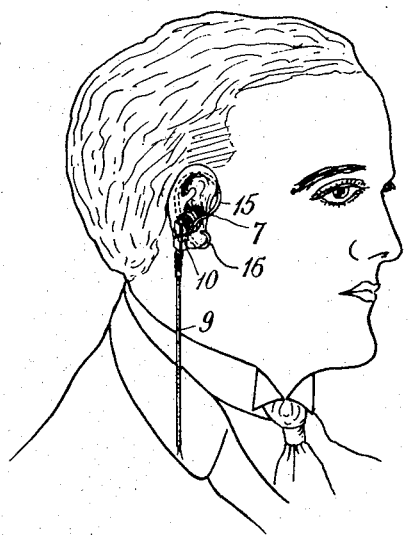
Fig. 1,
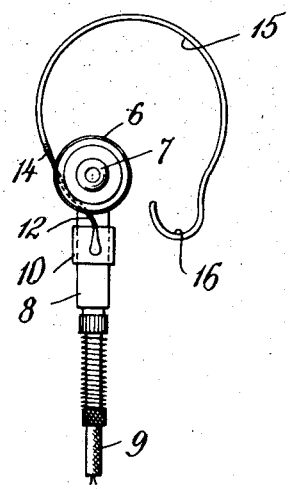
Fig. 2,
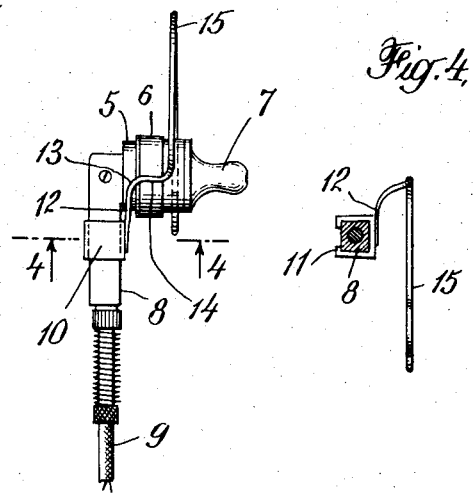
Fig. 3,
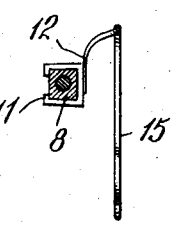
Fig. 4,
INVENTOR
Nathaniel Harman
BY
Pennie, Davis, Marvin & Edmonds
ATTORNEYS Patented June 8, 1926.

1,587,643

UNITED STATES PATENT OFFICE.

NATHANIEL HARMAN, OF NEW YORK, N. Y., ASSIGNOR TO DICTOGRAPH PRODUCTS CORPORATION, A CORPORATION OF VIRGINIA.

EAR-LOOP ATTACHMENT FOR DEAF PHONES.

Application filed June 2, 1925. Serial No. 34,366.

This invention relates to ear-loops commonly employed for supporting the ear pieces of instruments, such as deaf phones, and the like, in proper relation to the ear. Ear-pieces of this kind have a body portion which ends in a tip to be placed in the ear canal, and the ear-loops which are used with such ear-pieces encircle the ear and are largely concealed by it.

As heretofore constructed, ear-loops have been made of a wire material called "comfort cable" used for spectacle bows. The loop carries a bracket at one end in which the ear-piece is held, and from this bracket, the cable is bent to form a small loop in which the ear-lobe enters, then curves upwardly and laterally to pass over and behind the ear. The free end of the cable lies slightly above the bracket to one side of the latter, and when in use projects slightly beyond the ear in front of it.

This old form of ear-loop is unsatisfactory because the cable of which it is made is necessarily somewhat resilient, and the entire weight of the ear-piece and the cable leading to the transmitting device depends from one end while the other end is free. As a consequence, after the ear-loop has been in use for some time and the resilience of the cable has become lessened, a slight pull on the transmitting cable will readily cause a distortion of the loop so that the ear-piece will slip out of place. Furthermore, this type of ear-loop, even when new, is not satisfactory, except when used with a large ear having a well-developed lobe to enter into the smaller loop of the cable, for otherwise the adjustment depends entirely on the resilience of the cable, and a pull on the transmitting cable is likely to cause the loop to slip about the ear, thus displacing the ear-piece.

The ear-loop of the present invention is intended to overcome the difficulties above pointed out, and it is formed of a piece of cable attached at one end to the bracket in which the ear-piece is mounted. From this bracket, the cable extends rearwardly a short distance, then upwardly so as to lie in front of the ear when in use, and then downwardly and to one side so as to encircle the ear, the free end of the cable having the form of a hook which passes around the ear-lobe. The bracket is off-set from the plane in which the main body of the loop lies, and this off-set insures that the main body of the loop will lie close to the head, and also that the loop will lie clear of the small protuberance or tragus which lies in front of the ear and partially conceals the opening. The form of the new loop is such that the weight of the ear-piece causes the hook to grip the lobe tightly and any pull on the transmitting cable tends to contract the size of the loop and consequently the loop tightens its grip on the ear. This arrangement of the loop, therefore, gives added comfort to the user in that it insures that the ear-piece will be in proper position in the ear canal at all times.

In the accompanying drawings, there is illustrated that embodiment of the invention which is now preferred and in these drawings, Fig. 1 is a perspective view of the new ear-loop in use, Fig. 2 is a rear view in elevation, Fig. 3 is a side view in elevation, Fig. 4 is a sectional view looking upwardly on the line 4—4 of Fig. 3.

Referring to these drawings, the loop is illustrated in use with a common form of ear-piece 5, having a barrel shaped body 6 terminating in a tip 7 which is to be inserted in the ear canal. From the body there extends a portion 8, square in cross-section, in which is received the end of the transmitting cable 9 leading to the transmitting instrument. The square portion 8 is intended to be introduced into the bracket 10 of the ear-loop.

This bracket is a piece of metal bent to appropriate form and having a slot 11 through which the transmitting cable may pass when the ear-piece is placed in position. The loop is made of a piece of comfort cable and at one end is connected as by soldering to one face of the bracket. From this point, the cable is bent to one side as at 12, extends upwardly to a point 13 midway of the body, then is bent to the rear and extends along the body a short distance. This rearwardly extending portion 14 is provided so that with the loop in place the ear-piece will fit snugly in the ear-canal and the main body of the loop will lie close to the side of the head.

From the end of the portion 14, the cable curves upwardly, then laterally and downwardly to form the main body 15 of the loop which encircles the ear when in place. At its free end, the loop terminates in a hook 16 which is intended to pass around and overlie the lobe.

It will be observed that with the loop made in the manner described, the weight of the earpiece and the cable leading to the transmitting device, depends from the loop, and an accidental pull on the cable will tend to contract the size of the loop slightly, with the result that the hook 16 will grip the lobe more tightly, thus preventing any displacement of the tip of the ear-piece from the canal. The weight of the ear-piece and the transmitting cable thus always acts so as to cause the loop to fit the ear snugly, and the loop automatically adjusts itself to the shape of the ear. It may be used with ears of different shapes and sizes without causing discomfort.

With the old type of loop, the cable of which it is formed includes a small loop in which the lobe of the ear is received, this small loop encircling the lobe so as to prevent the main body of the loop from slipping about the ear. But unless the lobe is of fairly large size and this small loop is a close fit, it is without value in holding the main loop and ear-piece against displacement. In the new loop the terminal hook acts effectively without regard to the size of the lobe and as the ear-piece will be held in proper position at all time, it adds greatly to the comfort of the user. Also, except for the end of the hook and that portion of the loop which extends upwardly in front of the ear, it is entirely concealed from view, and is thus not unsightly.

I claim:

1. An ear-loop for supporting the ear-piece of an instrument such as a deaf-phone which comprises the combination of a bracket in which the ear-piece entering the ear-canal is mounted, and a piece of resilient cable extending upwardly from the bracket to pass in front of the ear, then curving laterally and downwardly to pass behind the ear, and terminating at its free end in a hook to pass around the ear-lobe.

2. An ear-loop for supporting the ear-piece of an instrument such as a deaf-phone, which comprises the combination of a bracket in which the ear-piece entering the ear-canal is mounted, and a piece of resilient cable connected to the bracket and extending rearwardly parallel to the axis of the ear-piece, then upwardly to pass in front of the ear, and then curving laterally and downwardly to pass behind the ear and encircle the latter.

3. An ear-loop for supporting the ear-piece of an instrument such as a deaf-phone, which comprises the combination of a bracket in which the ear-piece entering the ear-canal is mounted, and a piece of resilient cable connected to the bracket and extending rearwardly parallel to the axis of the ear-piece, then upwardly to pass in front of the ear and then curving laterally and downwardly to pass behind the ear, the cable terminating at its free end in a hook to be placed around the ear-lobe.

4. The combination of an ear-piece having a portion to enter the ear-canal and another portion extending laterally therefrom, a bracket receiving the portion last-mentioned and a piece of cable connected to the bracket, and extending partly around the first portion and along one side of it, then extending upwardly to pass in front of the ear, and then curving laterally and downwardly to pass around behind the ear to encircle the latter, the cable terminating in a hook to be placed around the ear-lobe.

In testimony whereof I affix my signature.

NATHANIEL HARMAN.